Nov. 13, 1951 M. CAMRAS 2,574,688

SWITCH FOR USE WITH A PERFORATED TAPE

Filed Dec. 22, 1947 2 SHEETS—SHEET 1

Inventor
MARVIN CAMRAS by The Firm of Charles [illegible]
Attys.

SWITCH FOR USE WITH A PERFORATED TAPE

Filed Dec. 22, 1947 2 SHEETS—SHEET 2

Inventor
MARVIN CAMRAS
by The Firm of Charles W. Hills
Attys.

Patented Nov. 13, 1951

2,574,688

UNITED STATES PATENT OFFICE 2,574,688

SWITCH FOR USE WITH A PERFORATED TAPE

Marvin Camras, Chicago, Ill., assignor to Armour Research Foundation of Illinois Institute of Technology, Chicago, Ill., a corporation of Illinois Application December 22, 1947, Serial No. 793,129

8 Claims. (Cl. 200—52)

My invention relates to magnetic recorders and an automatic stop device operable to discontinue the movement thereof when a predetermined point on the lengthy magnetizable record medium is reached.

In one method of recording and reproducing an intelligence, a lengthy magnetizable medium is caused to pass over an electromagnetic transducer head at predetermined linear velocity. During recording, a time varying electromotive force is applied to the winding of the head to cause a corresponding time varying magnetic field across the pole pieces thereof. Variations in the degree of magnetization along the length of the medium are imparted thereto as the incremental lengths thereof are exposed to the time varying magnetic field. During reproduction, the induced voltage in the winding of the head as the medium travels over the pole pieces thereof is amplified and converted by a loud speaker or other device to the original form of the intelligence.

One of the problems associated with the use of magnetic recording and reproducing equipment is that of controlling the mechanical and electrical mechanism in accord with the movements of the medium. Such control may be desirable to indicate the end of the medium, the end of a program, or a point in the program for cuing purposes.

In accordance with the present invention, an improved mechanism for accomplishing these ends is provided, which mechanism is operable to control the equipment in accord with the movements of the lengthy magnetizable record medium. Moreover, the mechanism is actuated by windows or openings in the magnetizable medium, which openings may be easily placed at any point thereon and, moreover, may be obliterated by covering them.

It is therefore a general object of the present invention to provide an improved mechanism for controlling the operation of a magnetic recorder in accord with the movements of the lengthy magnetizable record medium.

Further, it is an object of the present invention to provide an improved mechanism for controlling a magnetic recorder which is sensitive to the presence of an opening or window in the lengthy record medium.

Another object is to provide an improved magnetizable record medium for use with a mechanism having a tongue urged against the medium.

A further and more specific object of the present invention is to provide an improved mechanism for deenergizing the drive mechanism of a magnetic recorder and which holds the mechanism in the deenergized condition until manually reset.

It is still another object of the present invention to provide an improved switch mechanism operable to deenergize the drive mechanism of a magnetic recorder upon a predetermined event and which may be readily mounted on the recorder mechanism.

Further, it is an object of the present invention to provide an improved mechanism to deenergize a magnetic recorder upon a predetermined event, which mechanism includes features of construction, combination and arrangement whereby a simple and effective mechanism is provided which is of low cost and maximum utility.

The novel features which I believe to be characteristic of my invention are set forth with particularity in the appended claims. My invention, however, both as to its organization and method of operation, together with further objects and advantages thereof, may best be understood by reference to the following description taken in connection with the accompanying drawing, in which:

Figure 10:
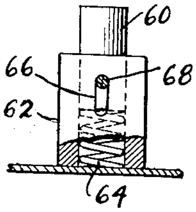
Figure 4:
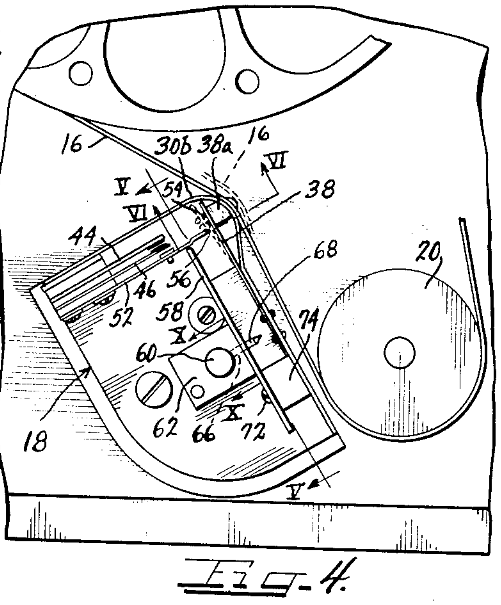
Figure 4 is a view like Figures 2 and 3 but showing the switch elements in the tripped position.
Figure 9:
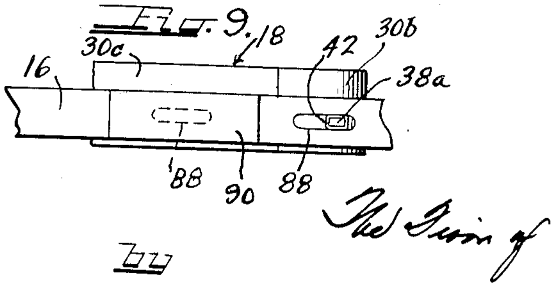

Figure 9 is a view showing a section of magnetizable recording medium bearing openings of the type to which the switch of the present invention is sensitive and showing an adhesive tape covering one opening, together with a fragmentary portion of the switch mechanism with the operating tongue received in the free opening; and Figure 10 is a fragmentary cross-sectional view through the axis X—X, Figure 4, with portions broken away to show the bias spring.

Figure 1:
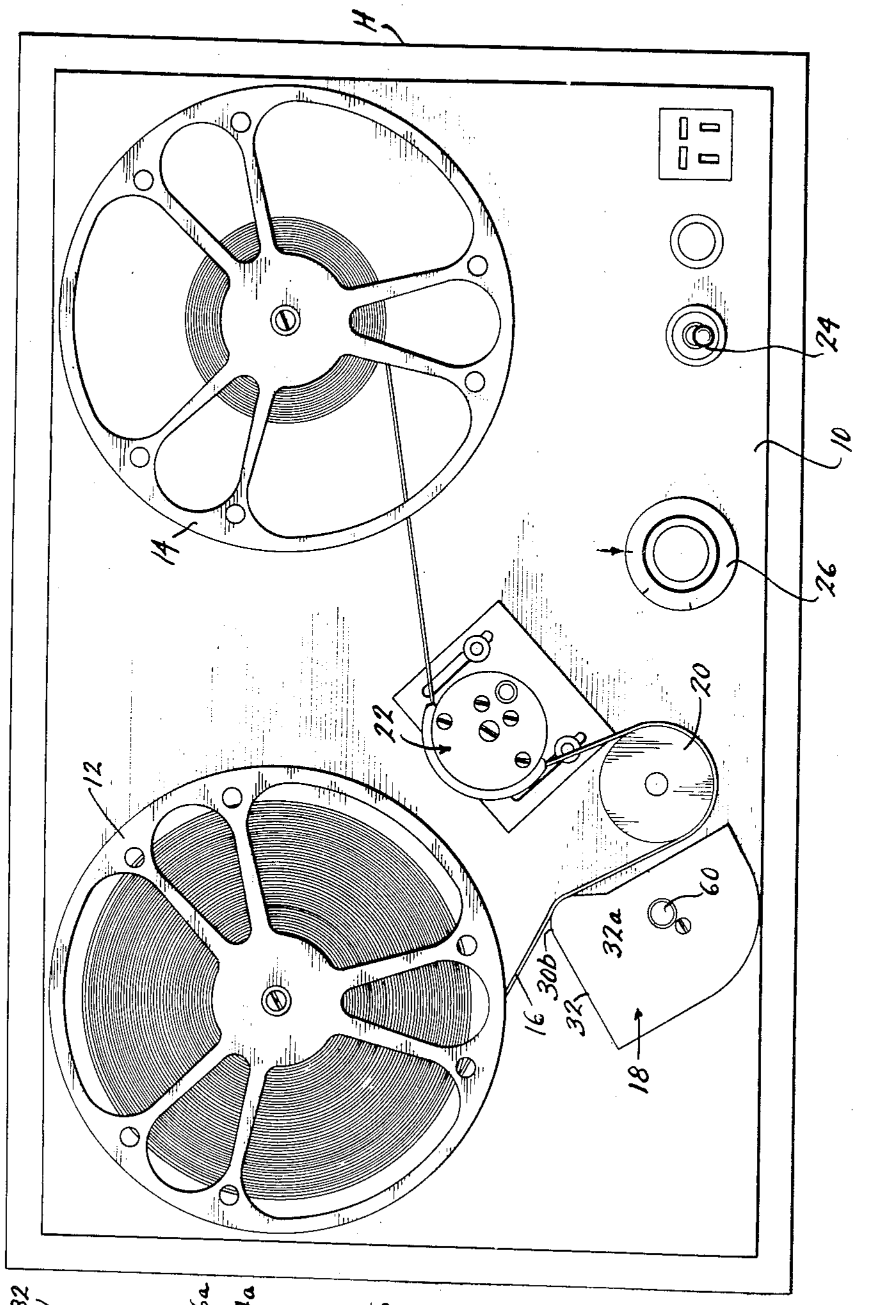
Figure 1 is a top plan view of an illustrative magnetic recorder of the type to which this invention is applicable.

As shown on the drawings:

Referring now to Figure 1, there is shown in top plan view a magnetic recorder having a housing H with a top panel 10 upon which a pair of reels 12 and 14 are supported for rotational movements. A lengthy pliable magnetizable medium 16 is wound about these reels and extends therebetween. In the region between the reels 12 and 14, the medium rides over the switch assembly generally indicated at 18, the drive pulley 20, and the head assembly generally indicated at 22. The medium 16 is a lengthy tape of pliable material such as paper or the like having a coating of magnetizable particles.

In the illustrative magnetic recorder shown in Figure 1, a general on-off switch 24 is mounted in the top panel 10 and may be manually shifted to connect the unit from the source of energizing power, such as, for example, a source of alternating voltage. In addition, a control knob 26 may be interconnected with switch elements operable to control the drive mechanism selectively to cause the medium 16 to be drawn from reel 12 to reel 14 for recording or reproducing operations or to be drawn in the opposite direction to rewind the medium on the reel 12. The head 22 may include selectively operable portions for coaction with separate tracks on medium 16 so that one track may be used when winding medium 16 in one direction between reels 12 and 14, and another track may be used in rewinding medium 16 in the other direction between reels 12 and 14.

The head assembly 22 includes a magnetic core having opposed pole pieces to define an air gap to bear against the medium 16. A coil is wound about the core and is connected to electrical energizing elements (not shown) which are operable to produce a time varying voltage thereacross in accord with the time variations in an intelligence desired to be recorded. As the medium 16 is drawn over the air gap of head 22, successive incremental portions of that medium partake of the magnetic field across that air gap with the result that the degree of magnetization of medium 16 is varied along its length in accord with the time variations of the intelligence recorded. During reproducing operations, the coil of the head 22 is connected to electrical amplifying elements sensitive to the induced voltage therein and hence the time variations of the flux in the core. Since the magnitude of the flux in the core varies in accord with the degree of magnetization of the incremental lengths of the medium 16 across the air gap thereof, the induced voltage in the coil, and hence the amplified voltage, varies in accord with the time variations of the intelligence, and the intelligence may be reproduced by a suitable reproducer as, for example, a loud speaker.

Since the trip mechanism of the present invention is operable in precisely the same manner whether the magnetic recorder and reproducer is operating to record or to reproduce, or both, I have used the term "magnetic recorder" herein to designate an apparatus capable of achieving magnetic recording, magnetic reproducing, rewinding of a magnetizable medium, or selectively operable to accomplish one or more of these functions.

Figure 2:
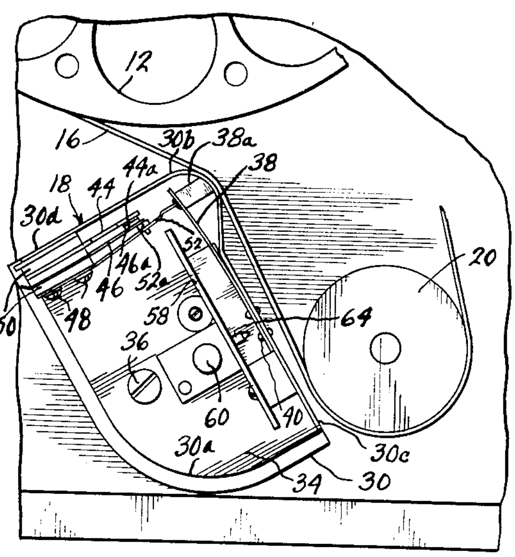
Figure 2 is an enlarged fragmentary view of the switch portion of the recorder of Figure 1 with the cover portion thereof removed to expose to view the elements mounted therein.

The switch assembly 18 includes a casing 30 which is best seen in the view of Figure 2 and which has a top cover 32, Figure 1. The casing 30 is of somewhat rectangular shape with a rounded-off corner portion 30*a* and an extended rounded corner portion 30*b*. The corner 30*b* acts as a guide to receive the medium 16. The casing 30 has a bottom portion 34 which rests on the top panel 10 of the housing H and is held thereon by the screw 36 which is received in a suitable opening in this portion and rests in a threaded hole in the top panel 10.

As will be evident from the views of Figures 1 and 2, the medium 16 rides over the rounded extended portion 30*b* of the switch 18 in the region between the guide pulley 20 and the reel 12. Moreover, the tension imparted to the medium 16 by the winding action of the reels 12 and 14 and which maintains the medium 16 taut between the guide pulley 20 and the reel 12 acts to urge the medium 16 against the surface of the extended portion 30*b* of the switch 18.

Figure 6:
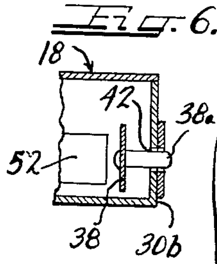
Figure 6 is an enlarged cross-sectional view along the axis VI—VI, Figure 4.

The switch 18 includes an actuating arm 38 having a tongue portion 38*a* facing the medium 16. The arm 38 is of resilient material, such as spring sheet steel, and is held against the forward wall 30*c* of the housing 30 by suitable rivets 40, Figure 2. As is best seen in the cross-sectional view of Figure 6, the enlarged portion 30*b* of the switch 18 has a window 42 to receive the tongue portion 38*a* of the actuating arm 38 and permits the latter to bear against the medium 16. When the medium 16 has no opening or window positioned over the tongue 38*a*, the arm 38 rides in the retracted position shown in Figures 2 and 3 and urges tongue 38*a* to an extended position relative to portion 30*b* of housing 30. However, when the tongue 38*a* rides against a point on the medium 16 having an opening or window, the tongue 38*a* extends therein as indicated in Figures 4 and 6.

As shown in Figure 4, the corners of tongue 38*a* are rounded to prevent catching on the edges of window 42, and thus tending to tear medium 16.

The switch 18 includes a pair of relatively movable contact arms 44 and 46, Figure 2. These elements are held to the side walls 30*d* of the housing 30 by the screws 48 which are received therein and urge these elements against insulating spacing blocks 50. The contact arms 44 and 46 each has contact buttons 44*a* and 46*a*, respectively, at their remote ends, these buttons being adapted to mate with each other to provide an electrically conducting connection.

An operating arm 52 having a button 52*a*, Figure 2, engages the movable contact arm 46 to urge contact button 46*a* against the contact button 44*a*. This operating arm is of spring steel or similar material and is held against the spacers 50 by the screws 48. In the unrestrained or free condition, this arm assumes the straight line configuration indicated in Figure 4 wherein the contact arms 44 and 46 swing free of each other.

Figure 7:
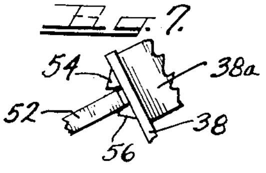
Figure 7 is an enlarged fragmentary view showing the catch element of the mechanism.

The actuating arm 38 is provided with catch elements to receive the end portion of the operating arm 52. This is best seen in the greatly enlarged fragmentary view of Figure 7 which shows the end portion of the arm 52 held in engagement with the actuating arm 38 and hence restrained from movement to the position of Figure 4. As indicated, these catch or latch elements 54 and 56 are of triangular shape and are spaced relative to each other with confronting facing edge portions on opposite sides of the arm 52 which is received between them. When the arm 52 is thus received, it is restrained against movement transverse to the axis of arm 38.

From the foregoing, it will be evident that when the switch 18 is in the normal condition shown in Figure 2, the catch elements 54 and 56 of the actuating arm 38 engage the operating arm 52 to swing the relatively movable contact buttons 44*a* and 46*a* to engaging relationship with each other to accomplish an electrically conducting condition therebetween. The unit is held in this condition by the medium 16 which bears against the tongue portion 38*a* of the arm 38 and prevents that portion from swinging to the free position of Figure 4 under the biasing action of the spring portion of the arm 38. However, when the portion 38*a* of the arm 38 is free to move under the biasing action of the arm 38, the catch or latch elements 54 and 56 are swung out of engagement with the end of the operating arm 52 and that arm is permitted to swing free. This causes the arm 52 to assume the straight-line position shown in Figure 4 and to swing to a spaced position relative to the contact arms 44 and 46. In this condition, there is no electrical connection between the contact buttons 44*a* and 46*a*.

One of the features of the present invention resides in the resetting arrangement whereby the switch 18 may be reset from the condition of Figure 4 to that of Figure 2. When the opening in the medium 16 which receives the tongue passes that portion, the medium 16 rides out of tongue 38*a* to a spaced position relative to the extended rounded portion 30*b* of housing 30 as indicated in the dashed lines of Figure 4. In this condition, tension of medium 16 urges arm 38 rearwardly until it bottoms against the tip portion of the arm 52 as indicated in the dotted lines of Figure 4. It will be noted that in this condition there is no change in the relative positions of the contact buttons 44*a* and 46*a* from the spaced positions assumed on tripping.

Figure 5:
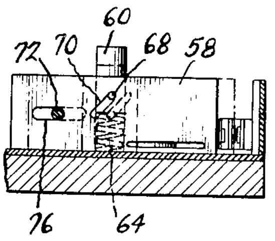
Figure 5 is a cross-sectional view along the axis V—V, Figure 4.

The reset mechanism includes a reset arm 58 which may be seen in side elevational view in Figure 5 and which may be shifted in its axial direction to engage the operating arm 52. When this shifting occurs, the operating arm 52 is flexed to the position shown in Figure 3 where the tip portion of that arm is received between the catch elements 54 and 56, Figure 3, to hold arm 52 in the flexed position. As will be evident from Figure 3, the contactor buttons 44*a* and 46*a* are then held in conducting relationship relative to each other. When the arm 58 is subsequently retracted to the position of Figure 2, the catch elements 54 and 56 hold the operating arm 52 in the flexed position.

The shifting movements of the arm 58 are controlled by the button 60 which extends through a suitable opening 32*a*, Figure 1, in the top cover 32. In addition, the button 60 is received in a suitable cylindrical opening in the block 62, which opening also receives the coil spring 64, Figure 5, which operates to urge the button 60 to the upward position. A side elevational view of the spring 64 is shown in the broken-away position of Figure 10.

The block 62 has an elongated opening 66 extending from the cylindrical cavity in which button 60 is received to the wall thereof facing the reset arm 58.

Figure 3:
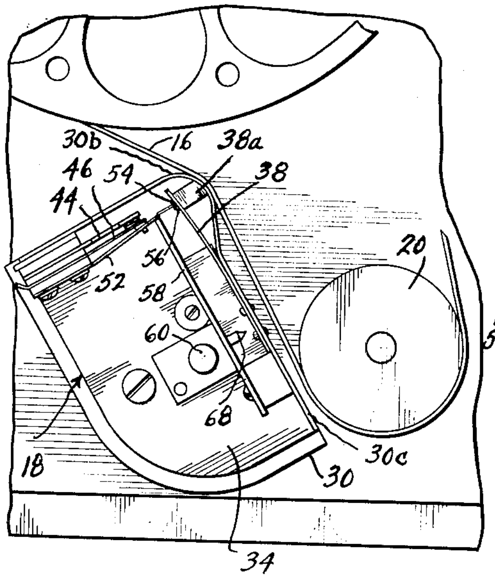
Figure 3 is a view like Figure 2 but showing the switch elements as they appear during the act of being reset.

A pin 68 is received in the button 60 and extends through the elongated opening 66 to the opposite side of the reset arm 58 as indicated in the views of Figures 2, 3 and 4. Reset arm 58 is provided with an elongated tilted slot 70 to receive the pin 68 as shown in Figure 5. As will further be evident from this figure, the axis of the elongated slot 70 is tilted relative to the reset arm 58 so that when the button 60 is in the upward or released position of Figure 5, the reset arm 58 is in the retracted position shown in that figure, Figure 2 and Figure 4. However, when the reset button 60 is depressed, the pin 68 rides in the bottom portion of the elongated slot 70 of the reset arm 58 to shift that arm to the position of dotted lines, Figure 5, where it forces the operating arm 52 into engagement with the catch elements 54 and 56 of the actuating arm 38.

The reset arm 58 is held for shifting movements in the direction of its axis by the screw 72 which holds that arm against the block 74 and which rides in the elongated slot 76, Figure 5.

From the foregoing, it will be evident that when the switch 18 is cocked to the normal conducting position of Figure 2, where operating arm 52 is held by the catch elements 54 and 56, the medium 16 rests against tongue 38*a* until an opening therein is reached at which time the arm 38 swings under the biasing action of its own spring portion to release the operating arm 52 from the catch elements 54 and 56 to disconnect the contactor buttons 44*a* and 46*a*.

Figure 8:
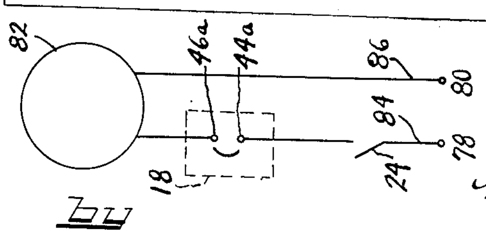
Figure 8 is a schematic circuit diagram showing one method of connecting the switch of the present invention.

Figure 8 is a schematic diagram illustrating how the switch 18 may be connected in circuit relationship with the elements of the magnetic recorder to deenergize the drive mechanism when a predetermined point in medium 16 is reached. In this figure, the mechanical operating elements of the recorder are indicated diagrammatically by the motor 82 which may, for example, be a single phase induction motor. Conductors 84 and 86 connect this motor to the terminals 78 and 80 to which a source of energizing potential is applied, thereby causing the motor 82 to operate. The switch 24 is between the motor 82 and the terminals 78 and 80 to permit selective manual disconnection of the motor from the source of energizing power. Moreover, the switch assembly 18 is connected in circuit relationship with the switch 24 and with the contact buttons 44*a* and 46*a* connected to opposite portions of the conductor 84. As wil be evident from this diagram, when the switch 18 is positioned as shown in Figure 2 with the contactors 44*a* and 46*a* in conducting relationship and the switch 24 is placed in the on position, the motor 82 is energized. On the other hand, when the connection between the switch elements 44*a* and 46*a* is broken the energizing connections between the motor 82 and the terminals 78 and 80 are broken and the motor no longer operates, thus arresting further movements of medium 16.

Figure 9 is a side elevational view showing the medium 16. This medium may, for example, consist of a lengthy tape of paper or similar material having a coating of magnetizable particles on one or both sides. At the ends of the tape, or other points where it is desired to deenergize the drive mechanism, elongated slots such as 88 are provided. These slots are of sufficient length and width to accommodate tongue 38*a* and act to permit the actuating m ıber 38 to assume the straight position shown in Figure 4 when the tongue 38*a* is aligned with a slot. The elongated slot or window 88 is made relatively long as compared tot he tongue 38*a* to give the latter ample time to shift to the engaging position of Figure 4 when the opening 88 passes thereover.

One of the features of the present invention resides in the fact that the openings 88 provided in the medium 16 may be obliterated at will by placing a length of adhesive tape over them. Such a length of tape is indicated at 90, Figure 9, and acts to cover the opening shown by the dotted lines of that figure. When this opening passes across the switch 18, the tongue 38a cannot pass therethrough and is held in the position of Figure 2.

From Figure 9 it will be evident that the openings or windows 88 in the medium 16 extend over only a relatively small portion of the width thereof. Since only a small portion of the active magnetizable coating is removed by the opening, there is very little tendency for a noticeable sound to be produced when a portion of the tape medium having an opening travels over the head 22, Figure 1. Moreover, the amount of this effect can be reduced as desired by making the tongue 38a of small width and using correspondingly narrow slots or windows 88.

A further feature of the present invention resides in the fact that when an opening 88 passes the switch 18 to cause the drive mechanism to be deenergized, the drive mechanism remains deenergized until the button 60 is depressed. Thus the inertia of the system which naturally tends to carry the medium 16 beyond the point at which the opening 88 rides over the portion 38a of the actuating arm 38 has no effect on the fact that the unit is stopped and there is no tendency for the unit to restart under this condition. It is thus unnecessary to make the elongated slot 88 any longer than is required to permit the catch 56 of arm 38 to release.

While I have shown and described the present invention as applied to stop magnetic recorder drive mechanism when a portion of the medium having an opening or window is reached, it will be apparent that the unit may be used for other purposes as well. Thus contact springs like 44 and 46 may, for example, be connected to drive elements to reverse the direction of movement of medium 16 when these contacts open, a single window being placed in medium 16 at the end of reel 12 to effect this action. In this case, the medium is automatically rewound on reel 12 after first being wound on reel 14. If a two-channel medium 16 is used with appropriate electromagnetic transducer heads operable on the separate channels, the buttons 44a and 46a, may, in addition, be connected to render the desired head operable, thus providing continuous uninterrupted reproduction of the intelligence contained on the two channels.

Moreover, if it is desired to provide some audible or visual signal when a portion of the medium 16 is reached, as, for example, for purposes of cuing performers, such signal may be connected to the contact buttons 44a and 46a and the medium 16 provided with windows or openings 88 at the point in the medium where this action is desired.

While I have shown a particular embodiment of my invention, it will, of course, be understood that I do not wish to be limited thereto since many modifications, both in the elements employed and in their cooperative structures, can be made without departing from the spirit and scope of my invention. I, of course, contemplate by the appended claims to cover any such modifications as fall within the true spirit and scope of my invention.

I claim as my invention:

1. A stop and reset mechanism for use in a device of the type wherein a lengthy medium having an opening travels over a predetermined path, said mechanism including an arm releasable to shift from a first position to a second position; reset means including a tongue proportioned to be received in said opening; switch means operatively connected to the reset means; elements sustaining said tongue in position to bear against said medium and urging said tongue against said medium, whereby said tongue is received in said opening when said opening is aligned therewith; means including a latch interconnecting said tongue and said arm to release said arm when said tongue shifts to a position within said opening whereby the switch means is opened; and said reset means including reset elements operable to shift said arm to a cocked position relative to said latch whereby the switch means is closed.

2. A stop and reset switch mechanism for use in a device of the type wherein a lengthy medium having an opening is caused to travel over a predetermined path, said mechanism having a tongue proportioned to be received in said opening; an arm sustaining said tongue in position to bear against said medium and urging said tongue against said medium, whereby said tongue is received in said opening when said tongue is in alignment therewith; a resilient arm; means sustaining said resilient arm on an axis substantially normal to the axis of said first arm, said means positioning said resilient arm for engagement with said first arm when said tongue bears against said medium and said resilient arm is in a flexed position, whereby said resilient arm is released when said opening is aligned with said tongue; and electrical contact members positioned for engagement with said resilient arm for actuation when said tongue rides into said opening.

3. A stop and reset switch for use in a device of the type wherein a lengthy medium having an opening is caused to travel over a predetermined path, said switch having a tongue proportioned to be received in said opening; a housing positioned to bear against said medium and having a window in the portion in engagement with said medium to receive said tongue; a member positioned within said housing and operable to urge said tongue to an extended position relative to said housing, said member having a catch portion; a member mounted within said housing and operable when released to assume a predetermined position, said last member being operable in a cocked position spaced from said predetermined position to engage said catch portion of said first member when said tongue engages said medium, whereby said last member moves from said cocked position to said predetermined position when said tongue rides in said opening; and switch elements operable in response to the movements of said last member.

4. A stop and reset switch for use in a device of the type wherein a lengthy medium having an opening is caused to travel over a predetermined path, said switch having a tongue proportioned to be received in said opening, a housing positioned to bear against said medium and having a window in the portion in engagement with said medium to receive said tongue; a first resilient arm mounted within said housing and sustaining said tongue, said arm being positioned to urge said tongue to an extended position through said window and against said medium; a second resilient arm positioned within said housing with its axis substantially perpendicular to the axis of said first arm, said second arm being operable in a cocked position to engage said first arm and to be held thereby when said tongue engages said medium; switch elements in operable engagement with said last arm to assume a conducting condition when said last arm is in said cocked position and a non-conducting condition when said last arm is released; and a reset arm shiftable in direction substantially parallel to said first arm to cock said second arm; and elements operable from without said housing to shift said reset arm to cock said second arm.

5. A stop and reset switch for use in a device of the type wherein a lengthy medium having an opening is caused to travel over a predetermined path, said switch having a tongue proportioned to be received in said opening; a housing positioned to bear against said medium and having a window in the portion in engagement with said medium to receive said tongue; a member positioned within said housing and operable to urge said tongue to an extended position relative to said housing; said member having a catch portion; a member mounted within said housing and operable when released to assume a predetermined position; switch elements operatively engaged with said last member for actuation upon movement of said member from a cocked position spaced from said predetermined position to said predetermined position; said last member being operable in said cocked position to engage said catch portion of said first member when said tongue engages said medium, whereby said last member moves from said cocked position to said released position when said tongue rides in said opening; and a reset member mounted within said housing assembly manually operative from without said housing to move said last member to said cocked position upon tripping thereof.

6. A stop and reset mechanism for use with a device of the type wherein a lengthy medium having an opening therein travels over a predetermined path, said mechanism including a movable arm, a tongue proportioned to be received in said opening, a switch actuated by said arm, biasing means urging said tongue in position to bear against said medium whereby said tongue is received in said opening when said opening is aligned therewith, a latch arranged to interconnect said biasing means and said arm, and a reset arm movable into engagement with said first-named arm to engage said first-named arm with said latch when said tongue is received in said opening 7. A stop and reset mechanism for use in a device of the type wherein a lengthy medium having an opening therein travels over a predetermined path, said mechanism including a movable arm, a tongue proportioned to be received in said opening, a switch actuated by said arm, biasing means carrying said tongue and urging said tongue in position to bear against said medium, whereby said tongue is received in said opening when said opening is aligned therewith, a latch arranged to interconnect said biasing means and said arm, and a reset arm disposed substantially normal to the first-named arm and movable into engagement with said first-named arm to engage said latch when said tongue is received in said opening.

8. A switch assembly for use in a device of the type wherein a lengthy medium having an opening therein is caused to travel over a predetermined path, a housing on one side of the medium having a surface arranged to engage one surface of said medium, said surface of said housing having a window therein, a tongue in said housing proportioned to be received in said opening in said medium, said tongue extending through said window and being confined to movement substantially axially of said window, a member positioned within said housing and operable to urge said tongue through said window, switch means in said housing engaging said tongue and releasable from said tongue directly upon projection of said tongue through said opening to thereby operate said switch.

MARVIN CAMRAS.

REFERENCES CITED

The following references are of record in the file of this patent:

UNITED STATES PATENTS

| Number | Name | Date |
|---|---|---|
| 449,780 | Muller et al. | Apr. 7, 1891 |
| 1,118,454 | Weeks | Nov. 24, 1914 |
| 1,251,286 | Rodman | Dec. 25, 1917 |
| 1,480,845 | Vidaver | Jan. 15, 1924 |
| 2,039,661 | Ritenour | May 5, 1936 |
| 2,069,595 | Thomas | Feb. 2, 1937 |
| 2,138,478 | Pedatella | Nov. 29, 1938 |
| 2,284,916 | Morris | June 2, 1942 |
| 2,290,150 | Hirschfeld | July 21, 1942 |